(12) United States Patent
Matsumoto et al.

(10) Patent No.: US 7,740,817 B2
(45) Date of Patent: Jun. 22, 2010

(54) CATALYST FOR PURIFYING EXHAUST EMISSION FROM INTERNAL COMBUSTION ENGINE, METHOD FOR PREPARATION THEREOF AND METHOD FOR PURIFYING EXHAUST EMISSION FROM INTERNAL COMBUSTION ENGINE

(75) Inventors: Takeshi Matsumoto, Utsunomiya (JP); Takao Kobayashi, Yokohama (JP); Takuji Nakane, Himeji (JP); Takahiro Uno, Himeji (JP); Makoto Horiuchi, Himeji (JP)

(73) Assignees: ICT Co., Ltd., Osaka (JP); International Catalyst Technology, Inc., Auburn Hills, MI (US)

( * ) Notice: Subject to any disclaimer, the term of this patent is extended or adjusted under 35 U.S.C. 154(b) by 1661 days.

(21) Appl. No.: 10/503,848

(22) PCT Filed: Feb. 14, 2003

(86) PCT No.: PCT/JP03/01556
§ 371 (c)(1),
(2), (4) Date: Aug. 6, 2004

(87) PCT Pub. No.: WO03/068394
PCT Pub. Date: Aug. 21, 2003

(65) Prior Publication Data
US 2005/0095188 A1 May 5, 2005

(30) Foreign Application Priority Data
Feb. 15, 2002 (JP) ............... 2002-037632
Apr. 10, 2002 (JP) ............... 2002-107989
Apr. 10, 2002 (JP) ............... 2002-107990

(51) Int. Cl.
B01D 53/34 (2006.01)
B01D 50/00 (2006.01)
B01D 53/94 (2006.01)
C01B 3/00 (2006.01)
C01B 23/00 (2006.01)
C01B 21/00 (2006.01)
C01B 25/00 (2006.01)
C01B 31/00 (2006.01)
C01B 33/00 (2006.01)
C01B 35/00 (2006.01)
C01G 28/00 (2006.01)
C01G 30/00 (2006.01)
B01J 23/00 (2006.01)
B01J 8/00 (2006.01)
B01J 21/00 (2006.01)
B01J 29/00 (2006.01)
B01J 20/00 (2006.01)

(52) U.S. Cl. ............... 423/213.2; 423/212; 423/213.5; 422/177; 422/180; 502/240; 502/242; 502/258; 502/263; 502/308; 502/309; 502/313; 502/320; 502/322; 502/323; 502/327; 502/332; 502/349; 502/350; 502/351; 502/354; 502/355; 502/415; 502/439; 502/527.11; 502/527.19

(58) Field of Classification Search ............... 502/240, 502/242, 258, 263, 308, 309, 313, 320, 322, 502/323, 327, 332, 349, 350, 351, 354, 355, 502/415, 439, 527.11, 527.19; 423/213.2, 423/213.5, 212; 422/177, 180
See application file for complete search history.

(56) References Cited
U.S. PATENT DOCUMENTS

| | | | | |
|---|---|---|---|---|
| 3,331,787 A | * | 7/1967 | Bair et al. | 502/223 |
| 3,489,809 A | * | 1/1970 | Romeo, Sr. et al. | 585/260 |
| 3,840,471 A | * | 10/1974 | Acres et al. | 502/177 |
| 4,335,023 A | * | 6/1982 | Dettling et al. | 502/262 |
| 4,404,007 A | | 9/1983 | Tukao et al. | |
| 4,420,316 A | * | 12/1983 | Frost et al. | 55/523 |
| 4,510,265 A | * | 4/1985 | Hartwig | 502/330 |
| 4,749,671 A | | 6/1988 | Saito et al. | |
| 4,833,115 A | * | 5/1989 | Koschlig et al. | 502/439 |
| 4,916,106 A | * | 4/1990 | Koschlig et al. | 502/309 |
| 5,157,007 A | | 10/1992 | Domesle et al. | |
| 5,258,150 A | * | 11/1993 | Merkel et al. | 264/43 |
| 5,334,570 A | * | 8/1994 | Beauseigneur et al. | 502/304 |
| 5,451,444 A | * | 9/1995 | DeLiso et al. | 428/116 |
| 5,512,250 A | * | 4/1996 | Betta et al. | 422/173 |
| 5,514,354 A | | 5/1996 | Domesle et al. | |
| 6,080,375 A | * | 6/2000 | Mussmann et al. | 423/213.5 |
| 6,159,431 A | * | 12/2000 | Inoue et al. | 422/180 |
| 6,300,263 B1 | * | 10/2001 | Merkel | 501/9 |
| 6,325,965 B1 | | 12/2001 | Makita et al. | |

(Continued)

FOREIGN PATENT DOCUMENTS

EP 0 211 233 2/1987

(Continued)

Primary Examiner—Cam N Nguyen
(74) Attorney, Agent, or Firm—Occhiuti Rohlicek & Tsao LLP

(57) ABSTRACT

A catalyst which efficiently removes particulate matter, SOF, sulfate, and SOOT and the like from the exhaust gas from such an internal combustion engine as a diesel engine without inducing a rise in the back pressure of the engine is provided. The catalyst for the purification of the exhaust gas of an internal combustion engine is formed by using an open flow honeycomb containing in the channel walls thereof such pores as possess an average diameter in the range of 10-40 μm.

24 Claims, No Drawings

U.S. PATENT DOCUMENTS

| | | | |
|---|---|---|---|
| 6,372,289 B1 * | 4/2002 | Hickman | 427/228 |
| 6,632,414 B2 * | 10/2003 | Liu | 423/659 |
| 2003/0024219 A1 * | 2/2003 | Harada et al. | 55/523 |
| 2003/0029147 A1 * | 2/2003 | Noda | 55/523 |
| 2003/0052043 A1 * | 3/2003 | Heibel et al. | 208/143 |
| 2003/0146131 A1 * | 8/2003 | Boger et al. | 208/65 |
| 2004/0118747 A1 * | 6/2004 | Cutler et al. | 208/208 R |
| 2004/0131512 A1 * | 7/2004 | Abe et al. | 422/180 |

FOREIGN PATENT DOCUMENTS

| | | |
|---|---|---|
| JP | 59-142820 | 8/1984 |
| JP | 5-138035 | 6/1993 |
| JP | 6-182204 | 7/1994 |
| JP | 2000-303826 | 10/2000 |
| JP | 2001-187344 | 7/2001 |

* cited by examiner

CATALYST FOR PURIFYING EXHAUST EMISSION FROM INTERNAL COMBUSTION ENGINE, METHOD FOR PREPARATION THEREOF AND METHOD FOR PURIFYING EXHAUST EMISSION FROM INTERNAL COMBUSTION ENGINE

FIELD OF THE INVENTION

This invention is related to a catalyst purifying exhaust gas of an internal combustion engine, a method of production thereof and a method for purifying the exhaust gas. In more detail the invention is related to a catalyst that is capable reducing particulate matter by trapping from the hazardous components of the exhaust gas especially particulates (mainly combustible carbon particulates) and by subsequent combustion or decomposition. Method for the production thereof and a method for the purification of exhaust gas from an internal combustion engine are described.

BACKGROUND ART

In recent years regulations on particulate matter emitted by internal combustion engines (mainly consisting of solid carbon particulates, sulfate and other sulfur containing particulates and liquid and solid hydrocarbon particulates) have been directed towards becoming more rigid due to their harmful impact on human body. Therefore to reduce the amount of emissions has been attempted in various fields. The field of the catalysts for purification of exhaust gas is no exception. Until now the methods for reducing particulate matter can be divided mainly into two fields: Catalysts with the function to trap particulate matter and oxidation catalysts with open flow substrates.

Under them catalyst technologies with trapping function mainly use substrates made of cordierite with wall flow, further to improve the efficiency of trapping particulate matter substrates made of silicon carbide are proposed. This method is intended to reduce exhausted particulate matter by trapping with a filter. This method is especially efficient if the particulate matter in the exhaust gas has a high ratio of dry soot. However, if the particulate matter is accumulated over a certain level back pressure is rising and a load can be inflicted on the engine even with the possibility leading to a complete engine stop. Especially in the case of the exhaust gas of an automobile to trap and burn particulate matter continuously throughout the whole range of engine operation is difficult because under various operation conditions of the engine the exhaust gas temperature is differing widely. Therefore, following methods are presently thought of to deal with above mentioned problem: 1) Trapping particulate matters in the low temperature area and burning them off in the higher temperature area. 2) Heat treatment methods to raise the temperature of the exhaust gas for regeneration of the catalyst by e.g. engine control, bypass and electrical heating. However, installing such heat treatment systems into automobiles is not quite realistic from the viewpoint of cost and space. Further a sudden combustion of trapped particulate matter in the catalyst leads to a dramatic rise of temperature therein leading to aging related problems such as melting of the filter.

On the other hand, heretofore oxidation catalysts have been the most reliable technologies and are widely in practical use. Oxidation catalysts are generally composed of an open flow honeycomb substrate coated with a catalytic active material. Their function is to reduce the soluble organic fraction (hereinafter referred to as SOF) from the particulate matter by absorption and subsequent combustion and decomposition. Hereby the amount of particulate matter is reduced, however, if the exhaust gas from the engine contains SOF in a low ratio, the particulate matter conversion is proportionally lower. Additionally in the case of high sulfur concentration in the fuel sulfur discharges at higher temperatures leading to higher particulate matter emissions which is another reason for concern.

An additional problem is that the catalysts function to trap and combust SOOT a considerable part of particulate matter is low resulting in a low conversion rate for particulate matter. Even at such low temperatures as such of an exhaust gas from a Diesel engine, which are remarkably lower than those of a gasoline engine (preferably lower than 350° C.), combustion of inflammable carbon particulates is requested from a good catalyst.

However, in heretofore proposed oxidation catalysts the part of the three dimensional structure which comes into contact with the gas is coated with a layer in which the catalytic active components are present as very fine particles. Therefore the contact efficiency between SOOT and the catalyst is very low and the catalytically active material is unable to bring up a sufficient combustion performance.

Therefore in recent years several methods have been proposed to raise the trapping efficiency. For example an attempt to higher the SOOT trapping efficiency of SOOT is by usage of an open flow substrate in which inorganic fibers are attached to the channel walls (the official gazette of JP-A-59-14282) or by the usage of an open flow honeycomb substrate with randomly arranged protuberances in large number on the channel walls (the official gazette of JP-A-57-99314). Another attempt to improve trapping SOOT and contact efficiency between it and the catalytically active component leading to higher SOOT combustion performance is by depositing a catalytically active component in form of protuberances on the gas inlet side of a diaphragm type gas filter (the official gazette of JP-A-7-24740). Also open flow or plugged type substrates that are able to raise trapping efficiency of SOOT were proposed. To generate protuberances on the channel walls coarse ceramic particles are attached or the surface of the channel walls are foamed (the official gazette of JP-A-58-14921).

However, the invention disclosed here is using an open flow honeycomb substrate with an average pore diameter of 10 to 40 μm in the channel walls. The catalytically active material and/or heat resistant inorganic substance is coated in form of protuberances onto the channel walls of above mentioned substrate without blocking its pores. By this trapping of SOOT and contact efficiency are improved leading to a raise in combustion performance of the catalyst. Such an invention has never been disclosed to date.

On the other hand in the official gazette of JP-A-10-151348 an open flow type oxidation catalyst containing cerium oxide and zirconium oxide is disclosed. The substrate used for this catalyst contains at least cerium oxide or zirconium, or both. By coating at least one metal oxide from the group of copper, iron and manganese onto this substrate, particulate matter combustion with high efficiency is possible. Further a technology using a coating of a metal of the platinum group and other catalyst components onto a filter type substrate has been proposed. Depending on the oxidation capacity of the catalytic material used, accumulated particulate matter in the filter can be removed by oxidation and combustion.

Further a catalyst can be thought of in which the particulates are combusted immediately when they come into contact with the catalytically active metal. If such a catalyst can be realized the above mentioned regeneration methods become obsolete because in such a catalyst a continuous regeneration takes place. However, in case high amounts of particulate matter is emitted from the engine, especially in the low temperature range the oxidation performance of the catalyst is not sufficient for a complete combustion and particulate matter is accumulating in the catalyst. In this case oxygen can not access with particulate matter blocked catalytically active metal sites and at the same time contact efficiency of newly incoming particulate matter with the catalyst is declining and therefore oxidation of particulate matter by the catalyst becomes increasingly difficult. Additionally at higher temperatures the accumulating part of hardly inflammable dry SOOT is high which makes a regeneration treatment of the catalyst necessary.

With the above mentioned problems in mind the purpose of the invention disclosed here is to provide an oxidation catalyst not using a filter but an open flow type substrate that is able to remove particulate matter by combustion from the free flowing exhaust gas.

Consequently, the object of the invention disclosed here is to offer a new catalyst for purifying exhaust gas from an internal combustion engine, the production thereof and a method to purify the exhaust gas from an internal combustion engine.

Another purpose of the invention disclosed here is to provide an exhaust gas purifying catalyst that is reducing harmful components especially particulate matter from the exhaust gas by trapping, combustion and decomposition. Also the production thereof and a method for purifying the exhaust gas from an internal combustion engine is described.

The objects mentioned above are accomplished by the following items (1)-(15).

(1) A catalyst for the purification of an exhaust gas of an internal combustion engine, formed by using an open flow honeycomb provided in the channel walls of cellular monolithic substrates with pores having an average diameter in the range of 10-40 μm.

(2) A catalyst according to item (1), wherein the channel walls in an open flow honeycomb substrate are coated with a catalytically active component.

(3) A catalyst according to item (1), wherein the catalytically active component is applied to the channel walls in the open flow honeycomb substrate by wash coating.

(4) A catalyst according to any of items (1)-(3) wherein the honeycomb has a rib thickness in the range of 0.05 mm-0.50 mm and a porosity in the range of 60-90%.

(5) A catalyst according to any one of items (1)-(4), wherein the amount of the catalytically active component coated to the substrate is in the range of 5-200 g/liter and the average diameter of pores in the channel walls in the catalyst after wash-coating of the catalytically active component is in the range of 10-40 μm.

(6) A catalyst for the purification of the exhaust gas of an internal combustion engine, having attached to an open flow honeycomb substrate a film comprising coarse granular protuberances of a catalytically active component and/or a heat-resistant substance and preventing pores in the channel walls in the substrate from being blocked and having formed in the substrate such pores as possess an average diameter in the range of 10-40 μm.

(7) A catalyst according to item (6), wherein the protuberances on the channel walls are formed of coarse granules containing granules exceeding 40 μm in diameter at a ratio of not less than 80% by weight and granules exceeding 300 μm in diameter at a ratio of not more than 5% by weight.

(8) A catalyst according to any one of items (1)-(7), wherein the catalytically active component contains at least one element selected from the class consisting of alkali metals, alkaline earth metals, and rare earth metals of Groups IIIB-VB and Period 3 and Groups IIIA-VIIA, VIII, IB-IVB and Periods 4, 5, and 6.

(9) A catalyst according to either of items (6) and (7), wherein the heat-resistant inorganic substance used in forming the coarse granular attached film contains at least one member selected from the class consisting of activated alumina, silica, titania, zirconia, silica-alumina, alumina-zirconia, alumina-titania, silica-titania, silica-zirconia, titania-zirconia, and zeolites.

(10) A method for the production of a catalyst for the purification of the exhaust gas of an internal combustion engine set forth in any one of items (6)-(9), characterized by mixing a coarse granular substance together with at least one dispersing agent selected from the group consisting of alumina sol, titania sol, zirconia sol, silica sol, soluble boehmite, and soluble organic macromolecular compounds into an aqueous slurry and applying the aqueous slurry and a catalytically active component by wash coating to an open flow honeycomb containing pores of an average diameter in the range of 10-40 μm in the channel walls thereof.

(11) A method according to item (10), wherein the catalytically active component is applied by wash coating after the aqueous slurry has been applied by wash coating.

(12) A method according to item (10), wherein the catalytically active component is applied by wash coating simultaneously with the aqueous slurry.

(13) A method for the purification of the exhaust gas of an internal combustion engine, characterized by passing the exhaust gas of the internal combustion engine through a catalyst set forth in any one of items (1)-(12).

(14) A method for the purification of the exhaust gas of an internal combustion engine, characterized by having the catalyst for the purification of an exhaust gas of an internal combustion engine set forth in any one of items (1)-(13) disposed on the upstream side or downstream side of an oxidizing catalyst relative to the flow of the exhaust gas.

(15) A method for the purification of the exhaust gas of an internal combustion engine, characterized by having the catalyst for the purification of an exhaust-gas of an internal combustion engine set forth in any one of items (1)-(13) disposed on the upstream side or downstream side of an $NO_x$ reducing catalyst relative to the flow of the exhaust gas.

BEST MODE OF EMBODYING THE INVENTION

In order for a catalyst to be capable of efficiently removing particulates by retention and combustion, it is required to acquire an enhanced coefficient of retention of particulates. If the amount of particulate matter to be trapped is unduly large, the excess will result in increasing the back pressure and consequently requiring a treatment for regeneration. It will further impair the contact of particulate matter with the catalyst and consequently degrade the efficiency of combustion. In order for the catalyst to acquire enhanced reliability, it is required to possess a proper trapping efficiency and to avoid inducing a sudden rise of back pressure.

It has been demonstrated that the catalyst of this invention is enabled to avoid the problems mentioned above by using an open flow type honeycomb as a substrate and further allowing the produced honeycomb catalyst to contain pores of an average diameter in the range of 10-40 μm in the channel walls thereof with a view to enabling the catalyst to possess a proper trapping efficiency.

If the average pore diameter exceeds 40 μm, though the loss of backpressure tends to decline, this excess will entail such problems as suffering particulate matter to escape from being trapped and pass through the pores owing to the large pore size and also such pores causing the substrate to lose strength. Conversely, if it falls short of 10 µm, though strength of the substrate is improved, the decline in pores will result in degrading the catalyst's efficiency of trapping the particulate matter. The pore size is preferred to be in the range of 15-35 µm.

When an open flow type substrate is adopted, it is preferred to be coated with a catalyst with a view to enhancing the ability of combustion because this substrate has a lower trapping efficiency than a filter type substrate and consequently requires to expedite the cycle of trapping and burning particulates. Though the catalytic component does not need to be particularly restricted, it may be formed of a platinum group element abounding in the reactivity of oxidation or endowed with an ability to absorb oxygen, for example. Further, the way to coat the catalytic component on the substrate may be accomplished, for example, by a method which consists in coating the interior of the substrate with the catalyst or a method which consists in applying the catalyst by wash coating to the surface of the substrate.

As the catalytic component in this invention, any of the components of oxidation catalysts, three way catalysts, lean burn engine catalysts, $NO_x$ adsorber, and reduction catalysts and others which have been heretofore known to the art may be used. Then, the catalytically active component is at least one metal selected from the class consisting of alkali metals, alkaline earth metals, and rare earth metals of the IIIB-VB families and the period 3 and the IIIA-VIIA, VIII, and IB-IVB families and the periods 4, 5, and 6 and their compounds. Preferably, it is formed of at least one metal selected from the class consisting of platinum, rhodium, palladium, silver, lanthanum, cerium, niobium, tantalum, tin, tungsten, zirconium, ruthenium, vanadium, manganese, copper, molybdenum, chromium, cobalt, nickel, iron, zinc, potassium, sodium, cesium, iridium, praseodymium, neodymium, rubidium, barium, calcium, magnesium, and strontium, or of a compound of such a metal.

As typical examples of the heat-resistant inorganic substance to be used in forming a coarse granular adhered film by mixing or depositing such active components as mentioned above, activated alumina, silica, titania, zirconia, silica-alumina, alumina-zirconia, alumina-titania, silica-titania, silica-zirconia, titania-zirconia, and zeolites may be cited. The substance for forming the coarse grain adhered film (hereinafter referred to as "coarse granular substance") contemplated by this invention, as specified above, contains particles exceeding 300 µm at a ratio of not more than 5% by weight and particles exceeding the average pore diameter of the substrate (generally in the range of 10-40 µm) at a ratio of at least 80% by weight, preferably not less than 90% by weight. In this case, the coarse substance may be formed solely of a catalytically active component or a heat-resistant inorganic substance or it may be manufactured by depositing a catalytically active component on a powder of the heat-resistant inorganic substance and molding the resultant composite in the form of coarse grains.

Though the method for manufacturing a catalyst having an adhered film formed of the coarse granular protuberances contemplated by this invention does not need to be specified, the following method may be cited as one proper concrete example.

Activated alumina pellets are impregnated with the aqueous solution of a water-soluble salt of a catalytically active component and the wet pellets consequently formed are dried and calcined. Subsequently, the produced calcined pellets are pulverized with a hammer mill (produced by Hosokawa Micron K.K. and marketed under the trademark designation of "PULVERIZER") and the resultant fine particles are classified with a classifier (such as, for example, the product of Hosokawa Micron K.K. sold under the trademark designation of "MICRON SEPARATOR, MS-0") to remove a microfine powder till the fine particles having a grain size larger than the average diameter of pores in a diaphragm possessing a filtering property amounts to a proportion of not less than 80% by weight. The fine particles are further sifted to remove coarse particles exceeding 300 µm in diameter.

Then, the granular substance resulting from the classification is thrown into an aqueous solution containing soluble boehmite (such as, for example, the product of CONDEA K.K. sold under the trademark designation of "DISPERAL") in a proportion in the range of 1-20% by weight as reduced to alumina and stirred therein. The stirred solution gives rise to a stable slurry because the granular active substance does not sink not only during the course of stirring as a matter of course but also after the stop of stirring owing to the thickening effect of the boehmite as a dispersing agent. The slurry is applied by wash coating to the open honeycomb substrate in an amount 10-50% larger than the amount absorbed by the substrate and the excess slurry is blown off with an air blower till the necessary amount of deposition is attained. Subsequently, the substrate coated with the slurry is dried at a temperature in the range of 80°-150° C. and calcined at a temperature in the range of 200°-800° C., particularly 300°-700° C.

In this method of production, the conversion of the coarse grain catalytically active component into the slurry may be carried out in the presence of at least one dispersing agent selected from the group consisting of such sols of alumina, titania, zirconia, and silica as possess a thickening effect enough for preventing the coarse particles from sedimenting and soluble boehmite and soluble organic polymer compounds. As typical examples of the soluble organic polymer compound which is properly used herein, such as polysodium acrylate, polyammonium acrylate, and sodium salts or ammonium salts of acrylic acid-maleic acid copolymer, polyethylene oxide, polyvinyl alcohol, carboxymethyl cellulose, methyl cellulose, hydroxyethyl cellulose, starch, gum arabic, guar gum, and glue may be cited. The slurry, for the purpose of enhancing the strength thereof to carry the corse granular catalytically active component, may have dispersed therein an inorganic fibrous substance such as, for example, glass fibers, alumina fibers, silicon nitride, silicon carbide, potassium titanate, or rock wool.

Further, for the purpose of rendering the catalyst coating layer more porous, the method which comprises adding a soluble organic polymer compound such as polyethylene glycol to the slurry and calcining the resultant mixed slurry thereby expelling the added compound may be additionally performed. If the slurry contains fine particles smaller than the average diameter of pores in the channel walls in a proportion not less than 20% by weight, the fine particles will be at a disadvantage in decreasing the produced catalyst's efficiency of trapping the flammable carbon particulates and degrading the catalyst's performance. Coarse particles having a grain size larger than 300 µm are at a disadvantage in suffering themselves to sediment quickly in the slurry and rendering uniform deposition thereof on the substrate difficult. If they are managed to be coated on the substrate at all, the strength of adhesion of deposition is not sufficient.

The production proper for this invention may be accomplished by another method which comprises having a coarse heat-resistant inorganic substance (having the grain size obtained by the same classification as described above) carried in advance on a three-dimensional structure and impregnating the resultant coated structure with a solution of the water-soluble or organic solvent-soluble salt of a catalytically active component thereby depositing the catalytically active component on the structure and completing a catalyst.

All the catalysts contemplated by this invention do not need to be produced exclusively by the methods described above. The method adopted for the production at all is only required to have the catalytically active component deposited in the form of protuberances on an open honeycomb and enable the produced catalyst to contain pores having an average diameter in the range of 10-40 μm in the channel walls thereof.

The porosity of the substrate is in the range of 50-90%, preferably 60-70%. If this porosity exceeds 90%, though the back pressure is lowered, the excess will be at a disadvantage in decreasing the amount of particulates to be trapped. Conversely, if the porosity falls short of 50%, though the amount of particulates to be trapped is increased, the shortage will be at a disadvantage in tending to impair the flow of gas passing through the wall thus increasing the back pressure because the flow velocity of the gas in the open part is increased.

The honeycomb substrates of this kind, however, are produced by the method of extrusion molding or the method of tightly winding a sheet like element. The shape of the mouth for passing the gas (the shape of the cell) may be any of such figures as hexagon, tetragon, triangle, and corrugation. The cell density (number of cells/unit cross section) in the range of 50-900 cells/square inch suffices for actual use. Preferably, this range is 100-600 cells/square inch.

The carrier to be used for this invention is preferred to be a heat-resistant three-dimensional structure. This heat-resistant three-dimensional structure is preferred to be an open flow type substrate which is specially formed of such a material as cordierite, mullite, lithium, aluminum, silicate, spinel, α-alumina, zirconia, titania, titanium phosphate, aluminum titanate, aluminosilicate, magnesium silicate, silicon carbide, or silicon nitride and others. Among the materials mentioned above, cordierite proves particularly advantageous.

The average diameter of the pores contained in the channel walls of the substrate is in the range of 10-40 μm, preferably 15-35 μm. If the average diameter falls short of 10 μm, though the strength of the substrate is exalted, the shortage will result in decreasing the air gap thus ultimately degrading the efficiency of trapping the particulates. Conversely, if the average diameter exceeds 40 μm, though the pressure loss tends to decline, the excess will result in blocking the fine pores in the substrate with the heat-resistant inorganic substance forming the granular protuberances and suffering the particulates to pass the pores without being trapped thereby. It will further pose a problem of degrading the strength of the substrate.

This invention does not need to limit its application particularly to the diesel engine but may be applied not only to the gasoline engine as a matter of course but also to such as internal combustion engine as emits particulates.

The catalytic component mentioned above can be applied by coating to the interior of the honeycomb, namely to the interiors of the pores formed in the honeycomb. In this case, the application by coating to the interiors of the pores can be mainly accomplished by immersing the honeycomb in a solution of the catalytic component and then blowing air or other gas into the channels of the honeycomb. Otherwise, the catalytic component may be applied by coating to the surface of the honeycomb, namely to the channel walls in the honeycomb. In this case, since the honeycomb is immersed in the slurry of the catalytic component and thereafter the channels in the honeycomb are blown with air or other gas, the excess of the slurry can be removed and the residue of the slurry on the surfaces of the channel walls can keep the honeycomb coated therewith. In this case, the interiors of the pores are coated to a certain extent as a matter of course.

The catalyst contemplated by this invention does not need particularly to limit the amount of the catalytically active component to be deposited on the substrate. The amount of the coarse granular substance which is specified by this invention is in the range of 5-200 g, preferably 20-150 g, per liter of the catalyst volume. Then, the amount of the heat-resistant inorganic substance to be used is in the range of 5-200 g, preferably 10-120 g per liter of the catalyst volume and the amount of the catalytically active component is in the range of 0.01-50 g, preferably 0.05-30 g, as reduced to an oxide or a metal per liter of the catalyst volume.

When the catalytically active material to be used happens to be a highly active precious metal, since the sulfur dioxide ($SO_2$) in the exhaust gas from the engine tends toward oxidation and terminates in the emission of sulfate, it is advantageous to use a low-sulfur fuel for the purpose of reducing this emission of sulfate.

The rib thickness of the substrate is in the range of 0.05-0.50 mm, preferably 0.15-0.35 mm. If the rib thickness falls short of 0.050 mm, the shortage will be at a disadvantage in decreasing the total pore volume of the substrate, consequently decreasing the amount of particulates to be trapped, and eventually degrading the catalyst's ability to purify the exhaust gas from particulates. Conversely, when the rib thickness exceeds 0.5 mm, the total pore volume of the substrate is increased and the amount of particulates to be trapped is proportionately increased. Since the excess tends toward impairing the flow of the gas passing through the wall of the substrate, however, the amount of particulates to be trapped will not increase in proportion to the total pore volume. After all, the excess will be at a disadvantage in preventing the catalyst from effecting necessary combustion of trapped particulates satisfactorily on account of the largeness of the amount of particulates so trapped and consequently requiring the catalyst to be given a treatment of some sort for regeneration thereof. Additionally, it is not desirable since it causes an increase in back pressure.

The catalyst which is so obtained as described above is enabled to purify the exhaust gas of the internal combustion engine by causing the exhaust gas to pass therethrough.

This invention is also directed toward providing a method for the purification of the exhaust gas, which is characterized by having the catalyst of this invention disposed on the upstream or downstream side of an oxidizing catalyst relative to the flow of the exhaust gas.

This invention is further directed toward providing a method for the purification of the exhaust gas, which is characterized by having the catalyst of this invention disposed on the upstream or downstream side of an $NO_x$ reduction catalyst relative to the flow of the exhaust gas.

When the catalyst of this invention answering the description given above is additionally disposed on the upstream or downstream side of the oxidation catalyst intended for the purification of the exhaust gas relative to the flow of the exhaust gas, the total conversion of particulate matter can be heightened throughout both the low temperature range and the high temperature range, because in the low temperature range more SOF is absorbed and burned and in the high temperature range more dry SOOT is removed from the exhaust gas. It has been demonstrated that the same effect can be obtained by disposing the aforementioned catalyst of this invention on the upstream or downstream side of the $NO_x$ reduction catalyst relative to the flow of the exhaust gas.

The term "oxidation catalyst" as used herein means what is obtained by depositing on a porous inorganic substance (such as, for example, alumina, silica, titania, or zirconia) an active metal (such as platinum or palladium) favorable for oxidation and coating an open flow honeycomb substrate with the resultant product of deposition. For example, platinum deposited on activated alumina by impregnation can be used as the coating component.

The term "reduction catalyst" as used herein refers to a catalyst selectively reducing hydrocarbons in a lean atmosphere or to $NO_x$ absorbing catalyst. As typical examples of the catalyst of the selectively reducing type resorting to HC, such catalysts as are obtained by coating an open flow honeycomb substrate with such a catalytic component produced by depositing copper on a zeolite by the technique of impregnation or the technique of ion exchange and such a catalytic component produced by depositing platinum on $\gamma$-$Al_2O_3$ or a zeolite may be cited.

As typical examples of the catalyst of the $NO_x$ absorbing type, such catalysts as are obtained by coating the same honeycomb substrate as mentioned above with such a catalytic component produced by combining such a component as platinum which oxidizes NO in the exhaust gas into $NO_2$ with the oxide of an alkali or alkaline earth metal which is capable of occluding $NO_2$ may be cited.

When the catalyst to be adopted is formed not in the filter type but in the open flow type or when the particulates entering the catalyst are made to contact the catalytic component and are continuously burnt at the same time, the catalyst does not need to withstand temperatures exceeding 1000° C. because the amount of particulates suffered to accumulate is small. When a catalytic component is used, this component is required to avoid reacting with the substrate within this temperature range.

When a highly active noble metal is used as a catalytic component, since the sulfur dioxide ($SO_2$) in the exhaust gas from the engine tends toward oxidation and terminates in the emission of sulfates, it is advantageous for the engine to use a low-sulfur fuel for the purpose of repressing this sulfate emission.

Now, this invention will be described specifically below with reference to working examples. It should be noted, however, that this invention is not limited to these working examples.

Method for Testing Performance of Purification of Exhaust Gas

An indirect injection type diesel engine (four cylinders, 3100 cc) was used as an internal combustion engine and a low-sulfur gas oil having a sulfur content of 0.005% by weight was used as the fuel for the internal combustion engine. First, a given catalyst for the purification of exhaust gas was attached to the interior of an exhaust gas pipe connected to the diesel engine mentioned above and the exhaust gas of the engine was passed through the exhaust gas pipe for one hour under the conditions of 2600 rpm full load in engine speed and 500° C. in temperature of the upstream side terminal of the catalyst for the purification of the exhaust gas (hereinafter referred to as "catalyst inlet temperature").

Then, the torque was so set that the exhaust gas flowed under the conditions of 2200 rpm in engine speed and 500° C. in catalyst inlet temperature.

The exhaust gas prior to entering the catalyst was sampled in a prescribed amount, introduced into a diluting tunnel and diluted therein with air, and subsequently passed through a commercially available particulate filter to trap the microfine substance present in the exhaust gas. The particulate filter which had trapped the microfine substance was weighed. The content of the microfine substance in the exhaust gas was calculated from the increment of the weight, the volume of the sampled exhaust gas, and the ratio of dilution with air. Incidentally, the ratio of dilution with air was found by determining the concentration of carbon dioxide in the exhaust gas.

Further, the content of SOF in the exhaust gas was found by extracting soluble organic substance from the particulate filter which had trapped the substance with dichloromethane thus determining the decrement of the weight of the particulate filter.

The content of sulfate in the exhaust gas was found by subjecting the particulate filter resulting from the extraction with dichloromethane to a treatment with isopropanol and analyzing the solution emanating from the treatment by high-speed liquid chromatography.

The amount of soot in the microfine substance was calculated by subtracting the weight of SOF and the weight of sulfate from the total weight of the microfine substance.

The purifying ratios of relevant components (degrees of conversion), namely the microfine substance conversion, the SOF conversion, the sulfate conversion, and the soot conversion, were found on the basis of the content of the particulate component prior to the contact with the catalyst produced as described above and the content of the particulate component subsequent to the contact with the catalyst. Let $X_0$ (mol) stand for the content prior to the contact with the catalyst and $X_1$ (mol) for the content after the contact with the catalyst, and following formula will be obtained.

$$\text{Purifying ratio (degree of conversion)}(\%)=[(X_0-X_1)/X_0]\times100$$

Method for Measuring Average Pore Diameter

The pores in the channel walls in the substrate and the catalyst were tested for average diameter by the use of a pore diameter analyzer (mercury injection type, made by Shimadzu Seisakusho Ltd. and sold under the trademark designation of "Autopore III 9420").

EXAMPLE 1

A cylindrical open flow type substrate of cordierite measuring 5.66 inches in diameter and 6.00 inches in length, and possessing a cell density of about 300 gas flow cells per square inch of cross section, containing in the channel walls thereof pores of an average diameter of 20 μm, and having a cell wall thickness of 0.31 mm and a porosity of 62.3% was used.

EXAMPLE 2

The open flow substrate described in Example 1 was dipped into an aqueous solution containing 167 g of platinum nitrate, 1000 g of cerium nitrate, and 1389 g of zirconium nitrate, removed from the solution and left standing to drain excess solution adhering to the substrate, dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum, 25 g of cerium oxide, and 25 g of zirconium oxide coated on the substrate per liter of the catalyst volume. It was further found to have the catalytic components distributed also in the texture of the cordierite. After wash coating of the catalyst, the average pore diameter in the channel walls was found to be 18 μm.

EXAMPLE 3

A slurry was produced by wet pulverizing 417 g of platinum nitrate, 1250 g of cerium oxide, and 1250 g of zirconium oxide. Then, the open flow substrate described in Example 1 was dipped into the resultant slurry, removed from the slurry and left standing to drain the excess slurry adhering to the substrate, dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum, 50 g of cerium oxide, and 50 g of zirconium oxide coated on the substrate per liter of the catalyst volume. After wash coating of the catalyst, the average pore diameter in the channel walls was found to be 12 μm.

EXAMPLE 4

A slurry was produced by wet pulverizing 1063 g of copper nitrate and 2500 g of γ-alumina having a surface area of 150 m²/g. The open flow substrate described in Example 1 was dipped into the resultant slurry, removed from the slurry and dried at 150° C. for 2 hours, and subsequently calcined at 500° C. for 1 hour. As a result, a catalyst for purifying an exhaust gas was obtained. The produced catalyst for the purification of an exhaust gas was found to have 7.0 g of copper oxide and 50 g of alumina coated on the substrate per liter of the catalyst volume. After wash coating of the catalyst, the average pore diameter in the channel walls was found to be 15 μm.

EXAMPLE 5

A slurry was produced by wet pulverizing 417 g of platinum nitrate and 2500 g of γ-alumina having a surface area of 150 m²/g. The open flow substrate described in Example 1 was dipped into the resultant slurry, removed from the slurry and dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum and 50 g of alumina coated on the substrate per liter of the catalyst volume. After wash coating of the catalyst, the average pore diameter in the channel walls was found to be 14 μm.

EXAMPLE 6

A catalyst for the purification of an exhaust gas was prepared by following the procedure of Example 2 while using a cylindrical open flow type substrate of cordierite measuring 5.66 inches in diameter and 6.00 inches in length, and possessing a cell density of about 300 gas flow cells per square inch of cross section, containing in the channel walls thereof pores of an average diameter of 35 μm, and having a porosity of 62.3% and a cell wall thickness of 0.31 mm instead. The produced catalyst for the purification of an exhaust gas was found to have 1.5 g of platinum, 25 g of cerium oxide, and 25 g of zirconium oxide coated on the substrate per liter of the catalyst volume. This catalyst was further found to have the catalytic component thereof distributed also in the interior of the texture of cordierite. After wash coating of the catalyst, the average pore diameter in the channel walls was found to be 32 μm.

EXAMPLE 7

A catalyst for the purification of an exhaust gas was prepared by following the procedure of Example 2 while using a cylindrical open flow type substrate of cordierite measuring 5.66 inches in diameter and 6.00 inches in length, and possessing a cell density of about 300 gas flow cells per square inch of cross section, containing in the channel walls thereof pores of an average diameter of 15 μm, and having a porosity of 62.3% and a cell wall thickness of 0.31 mm instead. The produced catalyst for the purification of an exhaust gas was found to have 1.5 g of platinum, 25 g of cerium oxide, and 25 g of zirconium oxide deposited on the substrate per liter of the catalyst volume. This catalyst was further found to have the catalytic component thereof distributed also in the interior of the texture of cordierite. After wash coating of the catalyst, the average pore diameter in the channel walls was found to be 11 μm.

EXAMPLE 8

A catalyst for the purification of an exhaust gas was prepared by following the procedure of Example 2 while using a cylindrical open flow type substrate of cordierite measuring 5.66 inches in diameter and 6.00 inches in length, and possessing a cell density of about 400 gas flow cells per square inch of cross section, containing in the channel walls thereof pores of an average diameter of 20 μm, and having a porosity of 75% and a cell wall thickness of 0.17 mm instead. The produced catalyst for the purification of an exhaust gas was found to have 1.5 g of platinum, 25 g of cerium oxide, and 25 g of zirconium oxide deposited on the substrate per liter of the catalyst volume. This catalyst was further found to have the catalytic component thereof distributed also in the interior of the texture of cordierite. After wash coating of the catalyst, the average pore diameter in the channel walls was found to be 18 μm.

EXAMPLE 9

A catalyst for the purification of an exhaust gas was prepared by following the procedure of Example 2 while using a cylindrical open flow type substrate of cordierite measuring 5.66 inches in diameter and 6.00 inches in length, and possessing a cell density of about 100 gas flow cells per square inch of cross section, containing in the channel walls thereof pores of an average diameter of 20 μm, and having a porosity of 68.9% and a cell wall thickness of 0.43 mm instead. The produced catalyst for the purification of an exhaust gas was found to have 1.5 g of platinum, 25 g of cerium oxide, and 25 g of zirconium oxide coated on the substrate per liter of the catalyst volume. This catalyst was further found to have the catalytic component thereof distributed also in the interior of the texture of cordierite. After wash coating of the catalyst, the average pore diameter in the channel walls was found to be 18 μm.

CONTROL 1

A cylindrical open flow type substrate of cordierite measuring 5.66 inches in diameter and 6.00 inches in length, and possessing a cell density of about 300 gas flow cells per square inch of cross section, containing in the channel walls thereof pores of an average diameter of 5 μm, and having a porosity of 74.3% and a rib wall thickness of 0.20 mm was used.

CONTROL 2

The open flow substrate described in Control 1 was dipped into an aqueous solution containing 167 g of platinum nitrate, 1000 g of cerium nitrate, and 1389 g of zirconium nitrate, removed from the solution and left standing to drain excess solution adhering to the substrate, dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum, 25 g of cerium oxide, and 25 g of zirconium oxide coated on the substrate per liter of the catalyst volume. It was further found to have the catalytic components distributed also in the texture of cordierite. After wash coating of the catalyst, the average pore diameter in the channel walls was found to be 4 μm.

CONTROL 3

A slurry was produced by wet pulverizing 417 g of platinum nitrate, 1250 g of cerium oxide, and 1250 g of zirconium oxide. The open flow substrate described in Control 1 was dipped into the resultant slurry, removed from the slurry and left standing to drain the excess slurry adhering to the substrate, dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum, 50 g of cerium oxide, and 50 g of zirconium oxide deposited on the substrate per liter of the catalyst volume. After wash coating of the catalyst, the average pore diameter in the channel walls was found to be 2 μm.

CONTROL 4

A slurry was produced by wet pulverizing 417 g of platinum nitrate and 2500 g of γ-alumina having a surface area of 150 m²/g. The open flow substrate described in Control 1 was dipped into the resultant slurry, removed from the slurry and dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum and 50 g of alumina deposited on the substrate per liter of the catalyst volume.

The catalysts obtained in Examples 1-9 and Controls 1-4 were tested for their ability to purify an exhaust gas in accordance with the test method described above. The conversion of various components of particulate matter were measured under a catalyst inlet temperature of 500° C. The results are shown in Table 1.

TABLE 1

|  | Particulate matter conversion (500° C.) (%) | SOF conversion (500° C.) (%) | Sulfate conversion (500° C.) (%) | SOOT conversion (500° C.) (%) |
| --- | --- | --- | --- | --- |
| Example 1 | 13 | 50 | 0 | 10 |
| Example 2 | 25 | 95 | −20 | 25 |
| Example 3 | 26 | 100 | −5 | 22 |
| Example 4 | 20 | 86 | −4 | 18 |
| Example 5 | 23 | 89 | 20 | 21 |
| Example 6 | 28 | 95 | −25 | 30 |
| Example 7 | 17 | 95 | −20 | 18 |
| Example 8 | 14 | 95 | −20 | 15 |
| Example 9 | 30 | 95 | −18 | 32 |
| Control 1 | 2 | 5 | 0 | 0 |
| Control 2 | 5 | 90 | −20 | 2 |
| Control 3 | 10 | 100 | −6 | 3 |
| Control 4 | 5 | 95 | −25 | 0 |

EXAMPLE 10

One (1) kg of a commercially available active alumina pellets (3-5 mmφ in diameter and 150 m²/g in surface area) were pulverized with a hammer mill and the resultant powder was classified with a classifying device till the portion of particles measuring not more than 30 μm in diameter decreased to below 20% by weight. Further, coarse particles measuring not less than 300 μm in diameter were removed by the use of a sieve. The coarse granular active substance consequently obtained was found to have a grain size distribution of 12.5% of a diameter of less than 30 μm, 13.5% of a diameter in the range of 30-45 μm, 22% of a diameter in the range of 45-74 μm, 0.27% of a diameter in the range of 74-105 μm, 12% of a diameter in the range of 105-149 μm, and 13% of a diameter in the range of 149-300 μm and an average particle diameter of 75 μm.

By dispersing 150 g of the powdery catalyst resulting from the classification in an aqueous solution obtained in advance by dissolving 15 g of soluble boehmite (11.25 g as reduced to $Al_2O_3$), 520 ml of a stabilized slurry was obtained. A cylindrical open flow type substrate of cordierite measuring 5.66 inches in diameter and 6.00 inches in length, possessing a cell density of about 300 gas flow cells per square inch of cross section, having a rib thickness of 0.30 mm, and containing in the channel walls thereof pores of an average diameter of 30 μm was dipped into the slurry, removed from the slurry, and treated with an air blower to drain the excess slurry adhering to the substrate. It was then dried at 150° C. for 3 hours and calcined in the air at 500° C. for 2 hours. As a result, coarse granular protuberances of a heat-resistant inorganic substance could be formed on the substrate. The amount of $Al_2O_3$ coated on the substrate was 40 g/l. After wash coating of the catalyst, the average pore diameter in the channel walls was found to be 25 μm.

EXAMPLE 11

The open flow substrate possessing coarse granular protuberances as described in Example 10 was dipped into an aqueous solution containing 167 g of platinum nitrate, 1000 g of cerium nitrate, and 1389 g of zirconium nitrate, removed from the aqueous solution, left standing to drain the excess solution adhered thereto, then dried at 150° C. for 2 hours, and subsequently calcined at 500° C. for 1 hour. As a result, a catalyst for purifying an exhaust gas was obtained. The so obtained catalyst was found to have 1.5 g of platinum, 25 g of cerium oxide, 25 g of zirconium oxide and 40 g of alumina coated on the substrate per liter of the catalyst volume. It was further found to have the catalytic component thereof distributed also in the interior of the texture of cordierite. After wash coating of the catalyst, the average pore diameter in the channel walls was found to be 20 μm.

EXAMPLE 12

A slurry was obtained by wet pulverizing 417 g of platinum nitrate, 625 g of cerium oxide, and 625 g of zirconium oxide. Then, the open flow substrate described in Example 10 was dipped into the resultant slurry, removed from the slurry and left standing to drain the excess slurry adhered to the substrate, dried at 150° C. for. 2 hours, and subsequently calcined at 500° C. for 1 hour. As a result, a catalyst for purifying an exhaust gas was obtained. The so obtained catalyst was found to have 1.5 g of platinum, 25 g of cerium oxide, 25 g of zirconium oxide, and 40 g of alumina deposited on the substrate per liter of the catalyst volume. After wash coating of the catalyst, the average pore diameter in the channel walls was found to be 18 μm.

EXAMPLE 13

A catalyst for purifying an exhaust gas was obtained by following the procedure of Example 11 after accomplishing the formation of coarse granular protuberances of a heat-resistant inorganic substance by following the procedure of Example 10 while using a cylindrical open flow type substrate of cordierite measuring 5.66 inches in diameter and 6.00 inches in length, possessing a cell density of about 300 gas flow cells per square inch of cross section, having a rib thickness of 0.30 mm, and containing pores of an average diameter of 40 μm instead. The produced catalyst for the purification of an exhaust gas was found to have 1.5 g of platinum, 25 g of cerium oxide, 25 g of zirconium oxide, and 40 g of alumina coated on the substrate per liter of the catalyst volume. It was further found to have the catalytic component distributed also in the interior of the texture of cordierite. After wash coating of the catalyst, the average pore diameter in the channel walls was found to be 35 μm.

EXAMPLE 14

A catalyst for purifying an exhaust gas was obtained by following the procedure of Example 11 after accomplishing the formation of coarse granular protuberances of a heat-resistant inorganic substance by following the procedure of Example 10 while using a cylindrical open flow type carrier of cordierite measuring 5.66 inches in diameter and 6.00 inches in length, possessing a cell density of about 300 gas flow cells per square inch of cross section, having a rib thickness of 0.30 mm, and containing pores of an average diameter of 25 μm instead. The produced catalyst for the purification of an exhaust gas was found to have 1.5 g of platinum, 25 g of cerium oxide, 25 g of zirconium oxide, and 40 g of alumina deposited on the substrate per liter of the catalyst volume. It was further found to have the catalytic component distributed also in the interior of the texture of cordierite. After wash coating of the catalyst, the average pore diameter in the channel walls was found to be 15 μm.

EXAMPLE 15

A catalyst for purifying an exhaust gas was obtained by following the procedure of Example 11 after accomplishing the formation of coarse granular protuberances of a heat-resistant inorganic substance by following the procedure of Example 10 while using a cylindrical open flow type substrate of cordierite measuring 5.66 inches in diameter and 6.00 inches in length, possessing a cell density of about 400 gas flow cells per square inch of cross section, having a rib thickness of 0.15 mm, and containing pores of an average diameter of 40 μm instead. The produced catalyst for the purification of an exhaust gas was found to have 1.5 g of platinum, 25 g of cerium oxide, 25 g of zirconium oxide, and 40 g of alumina coated on the substrate per liter of the catalyst volume. It was further found to have the catalytic component distributed also in the interior of the texture of cordierite. After wash coating of the catalyst, the average pore diameter in the channel walls was found to be 35 μm.

EXAMPLE 16

A catalyst for purifying an exhaust gas was obtained by following the procedure of Example 11 after accomplishing the formation of coarse granular protuberances of a heat-resistant inorganic substance by following the procedure of Example 10 while using a cylindrical open flow type substrate of cordierite measuring 5.66 inches in diameter and 6.00 inches in length, possessing a cell density of about 100 gas flow cells per square inch of cross section, having a rib thickness of 0.43 mm, and containing pores of an average diameter of 40 μm instead. The produced catalyst for the purification of an exhaust gas was found to have 1.5 g of platinum, 25 g of cerium oxide, 25 g of zirconium oxide, and 40 g of alumina deposited on the substrate per liter of the catalyst volume. It was further found to have the catalytic component distributed also in the interior of the texture of cordierite. After wash coating of the catalyst, the average pore diameter in the channel walls was found to be 35 μm.

EXAMPLE 17

In a solution of 167 g of platinum nitrate, 1000 g of cerium nitrate, and 1389 g of zirconium nitrate, 510 g of commercially available activated alumina pellets (3-5 mmφ in diameter and 150 m²/g in surface area) were placed, stirred therein at room temperature for 1 hour, removed from the solution and dried at 150° C. for 3 hours, and subsequently calcined at 500° C. for 2 hours. The calcined pellets were pulverized with a hammer mill and classified with a classifying device till the portion of particles measuring not more than 30 μm in diameter decreased to below 20% by weight. Further, the coarse particles not less than 300 μm in diameter were removed by the use of a sieve. The coarse granular active substance consequently obtained was found to have a grain size distribution of 13% of a diameter of less than 30 μm, 13% of a diameter in the range of 30-45 μm, 22% of a diameter in the range of 45-74 μm, 27% of a diameter in the range of 74-105 μm, 12% of a diameter in the range of 105-149 μm, and 13% of a diameter in the range of 149-300 μm and an average particle size diameter of 75 μm.

By dispersing 150 g of the powdery catalyst resulting from the classification in an aqueous solution obtained in advance by dissolving 15 g of soluble boehmite (11.25 g as reduced to $Al_2O_3$), 520 ml of a stabilized slurry was obtained.

A cylindrical open flow type substrate of cordierite measuring 5.66 inches in diameter and 6.00 inches in length, possessing a cell density of about 300 gas flow cells per square inch of cross section, having a rib thickness of 0.30 mm, and containing pores of an average diameter of 40 μm was dipped into the slurry, removed from the slurry and treated with an air blower to drain the excess slurry adhered to the substrate. The wet substrate was then dried at 150° C. for 2 hours and calcined in the air at 500° C. for 1 hour to have the catalytic component coated thereon. As a result, coarse granular protuberances of a heat-resistant inorganic substance could be formed. The catalyst for purifying an exhaust gas consequently obtained was found to have 1.5 g of platinum, 25 g of cerium oxide, 25 g of zirconium oxide, and 40 g of alumina coated on the substrate per liter of the catalyst volume. It was further found to have the catalytic component distributed also in the interior of the texture of cordierite. After wash coating of the catalyst, the average pore diameter in the channel walls was found to be 35 μm.

EXAMPLE 18

Coarse granular protuberances of a heat-resistant inorganic substance could be formed from commercially available titania pellets (3-5 mmφ in diameter and 30 m²/g in surface area) on a substrate by following the procedure of Example 10 while pulverizing and classifying the titania powder (average particle diameter of 65 μm) by following the procedure of Example 10. The amount of titania coated on the substrate was found to be 40 g/l. A catalytic component was coated on the substrate by following the procedure of Example 11. The catalyst for the purification of an exhaust gas consequently obtained was found to have 1.5 g of platinum, 25 g of cerium oxide, 25 g of zirconium oxide, and 40 g of titania deposited on the substrate per liter of the catalyst volume. It was further found to have the catalytic component distributed also in the interior of the texture of cordierite. After wash coating of the catalyst, the average pore diameter in the channel walls was found to be 35 μm.

EXAMPLE 19

Coarse granular protuberances of a heat-resistant inorganic substance could be formed from commercially available silica-alumina pellets ($SiO_2/Al_2O_3$=4/1) as a substrate by following the procedure of Example 10 while pulverizing and classifying the silica-alumina powder (average particle diameter of 72 μm) by following the procedure of Example 10. The amount of silica coated on the substrate was found to be 32 g/l and that of alumina to be 8 g/l. A catalytic component was coated on the substrate by following the procedure of Example 11. The catalyst for the purification of an exhaust gas consequently obtained was found to have 1.5 g of platinum, 25 g of cerium oxide, 25 g of zirconium oxide, 32 g of silica, and 8 g of alumina deposited on the substrate per liter of the catalyst volume. It was further found to have the catalytic component distributed also in the interior of the texture of cordierite. After coating of the catalyst the average pore diameter in the channel walls was found to be 35 μm.

CONTROL 5

A catalyst for purifying an exhaust gas was obtained by following the procedure of Example 11 after accomplishing the formation of coarse granular protuberances of a heat-resistant inorganic substance by following the procedure of Example 10 while using a cylindrical open flow type substrate of cordierite measuring 5.66 inches in diameter and 6.00 inches in length, possessing a cell density of about 300 gas flow cells per square inch of cross section, having a rib thickness of 0.20 mm, and containing pores of an average diameter of 15 μm instead. The produced catalyst for the purification of an exhaust gas was found to have 1.5 g of platinum, 25 g of cerium oxide, 25 g of zirconium oxide, and 40 g of alumina coated on the substrate per liter of the catalyst volume. It was further found to have the catalytic component distributed also in the interior of the texture of cordierite. After wash coating of the catalyst, the average pore diameter in the channel walls was found to be 5 μm.

CONTROL 6

A slurry was obtained by wet pulverizing 417 g of platinum nitrate, 625 g of cerium oxide, and 625 g of zirconium oxide. Then, the open flow substrate having coarse granular protuberances of a heat-resistant inorganic substance as described in Control 5 was dipped into the slurry, removed from the slurry and left standing to drain the excess slurry adhered to the substrate, then dried at 150° C. for 2 hours, and subsequently calcined at 500° C. for 1 hour. As a result, a catalyst for purifying an exhaust gas was obtained. The produced catalyst for the purification of an exhaust gas was found to have 1.5 g of platinum, 25 g of cerium oxide, 25 g of zirconium oxide, and 40 g of alumina coated on the substrate per liter of the catalyst volume. After wash coating of the catalyst, the average pore diameter in the channel walls was found to be 4 μm.

CONTROL 7

A catalyst for the purification of an exhaust gas was obtained by following the procedure of Example 11 after accomplishing the formation of coarse granular protuberances of a heat-resistant inorganic substance by following the procedure of Example 10 while having 1 kg of commercially available active alumina pellets (3-5 mmφ in diameter and 150 $m^2$/g in surface area) pulverized with a hammer mill until the average particle diameter reached 5 μm. The catalyst for the purification of an exhaust gas consequently obtained was found to have 1.5 g of platinum, 25 g of cerium oxide, 25 g of zirconium oxide, and 40 g of alumina coated on the substrate per liter of the catalyst volume. After wash coating of the catalyst, the average pore diameter in the channel walls was found to be 8 μm.

The catalysts obtained in Examples 10-19 and Controls 5-7 were tested for their ability to purify an exhaust gas in accordance with the test method described above. The conversion of various components of particulate matter were measured under a catalyst inlet temperature of 500° C. The results are shown in Table 1.

TABLE 2

| | Particulate matter conversion (500° C.) (%) | SOF conversion (500° C.) (%) | Sulfate conversion (500° C.) (%) | SOOT conversion (500° C.) (%) |
|---|---|---|---|---|
| Example 10 | 18 | 53 | 0 | 13 |
| Example 11 | 29 | 98 | −20 | 30 |
| Example 12 | 28 | 100 | −4 | 25 |
| Example 13 | 36 | 96 | −24 | 35 |
| Example 14 | 24 | 96 | −20 | 22 |
| Example 15 | 21 | 97 | −20 | 19 |
| Example 16 | 37 | 96 | −17 | 36 |
| Example 17 | 21 | 95 | −21 | 19 |
| Example 18 | 29 | 96 | −24 | 31 |
| Example 19 | 30 | 95 | −24 | 31 |
| Control 5 | 3 | 80 | −15 | 3 |
| Control 6 | 6 | 91 | −20 | 2 |
| Control 7 | 6 | 89 | −20 | 1 |

EXAMPLE 20

A cylindrical open flow type substrate of cordierite measuring 5.66 inches in diameter and 6.00 inches in length, possessing a cell density of about 400 gas flow cells per square inch of cross section, having a rib thickness of 0.15 mm, and containing pores of an average diameter of 5 μm was used. The substrate mentioned above was dipped into the slurry obtained as described in Example 5, removed from the slurry and left standing to drain the excess slurry adhered to the substrate, then dried at 250° C. for 2 hours, and subsequently calcined at 500° C. for 1 hour. As a result, an oxidation catalyst A was obtained. The oxidation catalyst A thus obtained was found to have 1.5 g of platinum and 50 g of alumina coated on the substrate per liter of the catalyst volume.

The catalyst for the purification of an exhaust gas described in Example 2 was disposed on the downstream side of the oxidation catalyst A relative to the flow of the exhaust gas.

EXAMPLE 21

The catalyst for the purification of an exhaust gas described in Example 2 was disposed on the upstream side of the oxidation catalyst A obtained in Example 20 relative to the flow of the exhaust gas.

EXAMPLE 22

A cylindrical open flow type substrate of cordierite measuring 5.66 inches in diameter and 6.00 inches in length, possessing a cell density of about 400 gas flow cells per square inch of cross section, having a rib thickness of 0.15 mm, and containing pores of an average diameter of 5 μm was used. The substrate mentioned above was dipped into a slurry obtained by wet pulverizing 1063 g of copper nitrate and 5000 g of ZSM-5 type zeolite having a surface area of 360 m$^2$/g, removed from the slurry and left standing to drain the excess slurry adhering thereto, dried at 150° C. for 2 hours, and subsequently calcined at 500° C. for 1 hour. As a result, an NO$_x$ reduction catalyst B was obtained. The reduction catalyst B consequently obtained was found to have 7.0 g of copper and 100 g of ZSM-5 type zeolite coated on the substrate per liter of the catalyst volume.

The catalyst for the purification of an exhaust gas described in Example 2 was disposed on the downstream side of the reducing catalyst B relative to the flow of the exhaust gas.

EXAMPLE 23

The catalyst for the purification of an exhaust gas described in Example 2 was disposed on the upstream side of the reduction catalyst B obtained in Example 22 relative to the flow of the exhaust gas.

The catalysts obtained in Examples 20-23 were evaluated in accordance with the method for testing described above. Specifically, their samples were tested for the conversion of various components of particulate matter under a catalyst inlet temperature of 500° C. The results are shown in Table 3. The SOF conversions determined at 200° C. were as shown in Table 4.

TABLE 3

| | Particulate matter conversion (500° C.) (%) | SOF conversion (500° C.) (%) | Sulfate conversion (500° C.) (%) | SOOT conversion (500° C.) (%) |
|---|---|---|---|---|
| Example 20 | 33 | 100 | −40 | 33 |
| Example 21 | 32 | 100 | −45 | 32 |
| Example 22 | 30 | 100 | −20 | 29 |
| Example 23 | 29 | 100 | −20 | 28 |

TABLE 4

| | SOF conversion (200° C.) (%) |
|---|---|
| Example 2 | 52 |
| Example 20 | 98 |
| Example 21 | 94 |
| Example 22 | 92 |
| Example 23 | 88 |

INDUSTRIAL APPLICABILITY OF THE INVENTION

This invention, owing to its possession of such a constitution as described above, is capable of not only trapping particulate matter exhausted by the exhaust gas of an internal combustion engine and decomposing and purifying them by passing the exhaust gas through the catalyst contemplated thereby but also purifying the exhaust gas by reducing SOF, sulfate, and soot therefrom with high efficiency.

The invention claimed is:

1. A catalyst for the purification of an exhaust gas of an internal combustion engine, comprising an open flow honeycomb substrate having channels, wherein the walls of the channels contain pores having an average diameter in the range of 10-40 μm.

2. A catalyst according to claim 1, wherein the walls of the channels in the open flow honeycomb substrate are coated with a catalytically active component.

3. A catalyst according to claim 2, wherein said catalytically active component is applied to the walls of the channels in said open flow honeycomb substrate by wash coating.

4. A catalyst according to claim 3, wherein the amount of said catalytically active component coated to said substrate is in the range of 5-200 g/liter, and the average diameter of pores in the walls of the channels of the coated substrate is in the range of 10-40 μm.

5. A catalyst according to claim 4, wherein said catalytically active component contains at least one member selected from the group consisting of platinum, rhodium, palladium, silver, lanthanum, cerium, niobium, tantalum, tin, tungsten, zirconium, ruthenium, vanadium, manganese, copper, molybdenum, chromium, cobalt, nickel, iron, zinc, potassium, sodium, cesium, iridium, praseodymium, neodymium, rubidium, barium, calcium, magnesium, and strontium, and compounds thereof.

6. A catalyst according to claim 3, wherein said catalytically active component contains at least one member selected from the group consisting of platinum, rhodium, palladium, silver, lanthanum, cerium, niobium, tantalum, tin, tungsten, zirconium, ruthenium, vanadium, manganese, copper, molybdenum, chromium, cobalt, nickel, iron, zinc, potassium, sodium, cesium, iridium, praseodymium, neodymium, rubidium, barium, calcium, magnesium, and strontium, and compounds thereof.

7. A catalyst according to claim 2, wherein said catalytically active component contains at least one member selected from the group consisting of platinum, rhodium, palladium, silver, lanthanum, cerium, niobium, tantalum, tin, tungsten, zirconium, ruthenium, vanadium, manganese, copper, molybdenum, chromium, cobalt, nickel, iron, zinc, potassium, sodium, cesium, iridium, praseodymium, neodymium, rubidium, barium, calcium, magnesium, and strontium, and compounds thereof.

8. A catalyst according to claim 1, wherein said honeycomb has a rib thickness in the range of 0.05 mm-0.50 mm and a porosity in the range of 60-90%.

9. A catalyst according to claim 1, wherein said internal combustion engine is a diesel engine.

10. A catalyst according to claim 1, wherein said open flow honeycomb substrate has a cell density of 100-600 cells/square inch.

11. A method for the purification of the exhaust gas of an internal combustion engine, comprising passing the exhaust gas of an internal combustion engine through a catalyst as set forth in claim 1.

12. A method for the purification of the exhaust gas of an internal combustion engine, wherein the catalyst as set forth in claim 1 is disposed on the upstream side or downstream side of an oxidizing catalyst relative to the flow of the exhaust gas.

13. A method for the purification of the exhaust gas of an internal combustion engine, wherein the catalyst as set forth in claim 1 is disposed on the upstream side or downstream side of an $NO_x$ reducing catalyst relative to the flow of the exhaust gas.

14. A catalyst for the purification of the exhaust gas of an internal combustion engine, having a film, comprising coarse granular protuberances of a catalytically active component and/or a heat-resistant substance, attached to an open flow honeycomb substrate having channels and preventing pores in the walls of the channels from being blocked said pores having an average diameter in the range of 10-40 μm.

15. A catalyst according to claim 14, wherein the coarse granular protuberances are formed of coarse granules containing granules exceeding 40 μm in diameter at a ratio of not less than 80% by weight and granules exceeding 300 μm in diameter at a ratio of not more than 5% by weight.

16. A catalyst according to claim 15, wherein said catalytically active component contains at least one member selected from the group consisting of platinum, rhodium, palladium, silver, lanthanum, cerium, niobium, tantalum, tin, tungsten, zirconium, ruthenium, vanadium, manganese, copper, molybdenum, chromium, cobalt, nickel, iron, zinc, potassium, sodium, cesium, iridium, praseodymium, neodymium, rubidium, barium, calcium, magnesium, and strontium, and compounds thereof.

17. A catalyst according to claim 16, wherein the heat-resistant inorganic substance used in forming said coarse granular attached film contains at least one member selected from the group consisting of activated alumina, silica, titania, zirconia, silica-alumina, alumina-zirconia, alumina-titania, silica-titania, silica-zirconia, titania-zirconia, and zeolites.

18. A catalyst according to claim 15, wherein the heat-resistant inorganic substance used in forming said coarse granular attached film contains at least one member selected from the group consisting of activated alumina, silica, titania, zirconia, silica-alumina, alumina-zirconia, alumina-titania, silica-titania, silica-zirconia, titania-zirconia, and zeolites.

19. A catalyst according to claim 14, wherein said catalytically active component contains at least one member selected from the group consisting of platinum, rhodium, palladium, silver, lanthanum, cerium, niobium, tantalum, tin, tungsten, zirconium, ruthenium, vanadium, manganese, copper, molybdenum, chromium, cobalt, nickel, iron, zinc, potassium, sodium, cesium, iridium, praseodymium, neodymium, rubidium, barium, calcium, magnesium, strontium, and compounds thereof.

20. A catalyst according to claim 19, wherein the heat-resistant inorganic substance used in forming said coarse granular attached film contains at least one member selected from the group consisting of activated alumina, silica, titania, zirconia, silica-alumina, alumina-zirconia, alumina-titania, silica-titania, silica-zirconia, titania-zirconia, and zeolites.

21. A catalyst according to claim 14, wherein the heat-resistant inorganic substance used in forming said coarse granular attached film contains at least one member selected from the group consisting of activated alumina, silica, titania, zirconia, silica-alumina, alumina-zirconia, alumina-titania, silica-titania, silica-zirconia, titania-zirconia, and zeolites.

22. A method for the production of a catalyst for the purification of the exhaust gas of an internal combustion engine set forth in claim 14, comprising mixing a coarse granular substance together with at least one dispersing agent selected from the group consisting of alumina sol, titania sol, zirconia sol, silica sol, soluble boehmite, and soluble organic macromolecular compounds into an aqueous slurry and applying said aqueous slurry and a catalytically active component by wash coating an open flow honeycomb containing pores of an average diameter in the range of 10-40 μm in the channel walls thereof.

23. A method according to claim 22, wherein said catalytically active component is applied by wash coating after the aqueous slurry has been applied by wash coating.

24. A method according to claim 22, wherein said catalytically active component is applied by wash coating simultaneously with said aqueous slurry.

\* \* \* \* \*